United States Patent

McCullough

[11] Patent Number: 6,139,783
[45] Date of Patent: Oct. 31, 2000

[54] METHOD OF MOLDING A THERMALLY CONDUCTIVE ARTICLE

[75] Inventor: Kevin A. McCullough, Warwick, R.I.

[73] Assignee: Chip Coolers, Inc., Warwick, R.I.

[21] Appl. No.: 09/248,798

[22] Filed: Feb. 12, 1999

[51] Int. Cl.$^7$ ............................ B29C 70/62; B29C 67/24
[52] U.S. Cl. ..................... 264/40.1; 264/104; 264/108; 264/328.12; 264/105
[58] Field of Search ..................... 264/104, 105, 264/299, 319, 328.1, 328.12, 108, 40.1

[56] References Cited

U.S. PATENT DOCUMENTS

| | | | |
|---|---|---|---|
| 4,113,812 | 9/1978 | Talbott et al. | 264/24 |
| 4,778,635 | 10/1988 | Hechtman et al. | 264/24 |
| 4,839,112 | 6/1989 | Wynne et al. | 264/22 |
| 5,011,728 | 4/1991 | Imae et al. | 428/156 |
| 5,017,312 | 5/1991 | Peters et al. | 264/24 |
| 5,045,972 | 9/1991 | Supan et al. | 361/387 |
| 5,066,449 | 11/1991 | Kato et al. | 264/406 |
| 5,149,482 | 9/1992 | Sorensen | 264/255 |
| 5,223,281 | 6/1993 | Hehl | 425/575 |
| 5,262,112 | 11/1993 | Sorensen | 264/255 |
| 5,366,688 | 11/1994 | Terpstra et al. | 419/36 |
| 5,388,983 | 2/1995 | Hehl | 425/575 |
| 5,492,467 | 2/1996 | Hume et al. | 425/549 |
| 5,523,049 | 6/1996 | Terpstra et al. | 419/36 |
| 5,580,512 | 12/1996 | Koon et al. | 264/438 |
| 5,674,439 | 10/1997 | Hume et al. | 264/40.6 |
| 5,705,008 | 1/1998 | Hecht | 156/148 |
| 5,834,337 | 11/1998 | Unger et al. | 438/122 |
| 5,846,356 | 12/1998 | Vyakarnam et al. | 156/62.6 |
| 5,858,301 | 1/1999 | Hashimoto | 264/531 |
| 5,888,340 | 3/1999 | Vyakarnam et al. | 156/379.7 |

*Primary Examiner*—Angela Ortiz
*Attorney, Agent, or Firm*—Barlow, Josephs & Holmes, Ltd.

[57] ABSTRACT

A method of molding a thermally conductive article for transferring heat from a heat generating surface is provided. A mold assembly is first provided which is capable of forming an article of a desired configuration. The initial location of contact on the article with the heat generating surface is then determined. An input gate is formed in the mold assembly at the initial location of contact. The optimum heat flow path through the article is determined. A termination location of the heat flow path is determined. Polymer, loaded with conductive filler, is introduced into the mold assembly via the input gate. Venting is provided in the mold assembly at the termination location of the heat flow path. Polymer is positioned in the mold assembly with the conductive filler being substantially parallel and aligned with the heat flow path. Finally, the molded article is ejected from the mold assembly. With the molding method of the present invention, thermal conductivity of articles may be increased several times over the thermal conductivity realized with conventional molding methods.

7 Claims, 2 Drawing Sheets

METHOD OF MOLDING A THERMALLY CONDUCTIVE ARTICLE

BACKGROUND OF THE INVENTION

The present invention relates generally to an improved method of molding a thermally conductive article from composite material. More specifically, the present invention relates to a method of molding a thermally conductive article that is easily moldable while yielding thermal conductivities many times greater than prior art molding methods even employing known materials.

In the heat sink industry, it has been well known to employ metallic materials for thermal conductivity applications, such as heat dissipation for cooling semiconductor device packages. For these applications, such as heat sinks, the metallic material typically is tooled or machined from bulk metals into the desired configuration. However, such metallic conductive articles are typically very heavy, costly to machine and are susceptible to corrosion. Further, the geometries of machined metallic heat dissipating articles are very limited to the inherent limitations associated with the machining or tooling process. As a result, the requirement of use of metallic materials which are machined into the desired form, place severe limitations on heat sink design particular when it is known that certain geometries, simply by virtue of their design, would realize better efficiency but are not attainable due to the limitations in machining metallic articles.

It is widely known in the prior art that improving the overall geometry of a heat dissipating article, can greatly enhance the overall performance of the article even if the material is the same. Therefore, the need for improved heat sink geometries and lower cost necessitated an alternative to the machining of bulk metallic materials. To meet this need, attempts have been made in the prior art to provide molded compositions that include conductive filler material therein to provide the necessary thermal conductivity. The ability to mold a conductive composite enabled the design of more complex part geometries to realize improved performance of the part.

The attempts in the prior art included the employment of a polymer base matrix loaded with a granular material, such as boron nitride grains. Also, attempts have been made to provide a polymer base matrix loaded with flake-like filler material. These attempts are, indeed, moldable into complex geometries but still do not approach the desired performance levels found in metallic machined parts. It is a known in the art that filler material, particularly high aspect ratio filler material, will align parallel with the flow path of the base matrix within a mold. Therefore, these conductive composite materials must be molded with extreme precision due to concerns of filler alignment during the molding process. This is of concern when the filler material is non-symmetrical or when there is an aspect ratio greater than 1:1 of the thickness to the length of the filler. Even with precision molding and design, inherent problems of fluid turbulence, collisions with the mold due to complex product geometries make it impossible to position the non-symmetrical filler ideally thus causing the composition to perform far less than desirable. This problem is exacerbated when the filler has an aspect ratio greater than 10:1. This is a serious concern because filler is commonly employed that has an aspect ratio up to 40:1.

Moreover, the entire matrix of the composition must be satisfactory because heat transfer is a bulk property rather than a direct path property such as the transfer of electricity. A direct path is needed to conduct electricity. However, heat is transferred in bulk where the entire volume of the body is employed for the transfer. Therefore, even if a highly conductive narrow conduit is provided through a much lower conductive body, the heat transfer would not be as good as a body which is consistently marginally conductive throughout the entire body. Therefore, consistency of the thermal conductivity of the entire matrix of the composite body is essential for overall high thermal conductivity. Moreover, the proper alignment of the loaded filler material, particularly high aspect ratio filler, within the polymer base is of critical importance.

In view of the foregoing, there is a demand for an improved method of molding thermally conductive articles of composite material. In addition, there is a demand for a method of molding that can fully exploit the employment of composite polymer and filler material; namely, the proper alignment and positioning of filler material with the base polymer matrix. There is also a demand for such a method to enable such polymer and high aspect ratio filler compositions to be easily molded into complex product geometries. There is also a demand for such a method of molding to form an article that exhibits thermal conductivity as close as possible to purely metallic conductive materials while being relatively low in cost to manufacture.

SUMMARY OF THE INVENTION

The present invention preserves the advantages of prior art methods for molding thermally conductive articles from thermally conductive plastic compositions. In addition, it provides new advantages not found in currently known methods and overcomes many disadvantages of such currently available methods.

The invention is generally directed to the novel and unique method of molding a thermally conductive article from thermally conductive plastic composite material that has particular application in heat sink applications and particularly where heat must be moved from one region to another to avoid device failure. The method of the present invention enables a composite material of polymer material and conductive filler, such as a high aspect ratio filler, to molded in the most thermally conductive efficient manner while still maintaining low manufacturing costs.

A method of molding a thermally conductive article for transferring heat from a heat generating surface is provided. A mold assembly is first provided which is capable of forming an article of a desired configuration. The initial location of contact on the article with the heat generating surface is then determined. An input gate is formed in the mold assembly at the initial location of contact. The optimum heat flow path through the article is determined. A termination location of the heat flow path is determined. Polymer, loaded with non-symmetrical conductive filler, is introduced into the mold assembly via the input gate. Venting is provided in the mold assembly at the termination location of the heat flow path. Polymer is positioned in the mold assembly with the conductive filler being substantially parallel and aligned with the heat flow path. Finally, the molded article is ejected from the mold assembly. With the molding method of the present invention, thermal conductivity of articles may be increased several times over the thermal conductivity realized with conventional molding methods by properly aligning the filler material within the molding article body.

It is therefore an object of the present invention to provide a method of molding an thermally conductive article that is thermally optimized.

It is an object of the present invention to provide a method of molding a thermally conductive article of a polymer and non-symmetrical high aspect ratio conductive filler material that positions and aligns the conductive filler for optimal thermal transfer through the article.

It is a further object of the present invention to provide a method of molding a thermally conductive article that achieves higher thermal conductivity than prior methods while employing the same polymer and filler composition.

Another object of the present invention is to provide a method of molding an article of conductive composite material with high aspect ratio filler into complex part geometries.

It is a further object of the present invention to provide a method of molding an article of conductive composite material that has a thermal conductivity close to pure metallic materials.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
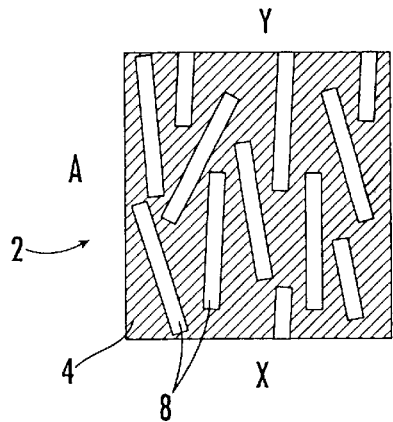
FIG. 1 is a cross-sectional view of a prior art conductive composition of a polymer base matrix loaded with high aspect ratio filler.

In the present invention, the method of molding a thermally conductive article employs a conductive composite material of a base polymer matrix loaded with a conductive filler material which is preferably high aspect ratio filler such as aluminum, alumina, copper, magnesium and brass material formed into either elongated fibers, strands, rice or flakes. As shown in FIG. 1, a prior art composite material 2, which is readily commercially available, is shown. In particular, this prior art composite material 2 generally shows a base matrix of polymer 4, for example, loaded with non-symmetrical filler material 8. This composition is shown in enlarged detail for clarity and ease of illustration.

As can be understood, the loading of thermally conductive filler 8 in a polymer base matrix 4 will render the material thermally conductive while permitting the material to be moldable. When employed as a thermal conductor, the material 2 must thermally transfer heat from, for example, side X to side Y of the material. During this transfer, heat must travel from heat conductive filler member to the adjacent heat conductive filler member to travel the path from X to Y. The selected filler 8 in FIG. 1 is preferably high aspect ratio fiber or strands to reduce the number of interfaces between several filler members as well as the non-conductive polymer residing therebetween. The more interfaces that heat must cross and the more polymer the heat must pass through, the more degraded the thermal conductivity will be. Further, too much loading of filler material would prevent the base polymer from wetting out resulting in undesirable small air pockets in the finished molded product.

An ideal arrangement of the composition of FIG. 1 includes a high aspect ratio filler 8 within a polymer base matrix 4. It is critical to align the high aspect ratio filler as parallel as possible to the thermal flow path to effectively decrease the overall number of interfaces and volume of base polymer over which the heat must travel. FIG. 1 illustrates a realistic arrangement of filler 8 with the base polymer matrix where the filler 8 is generally aligned parallel with one another and aligned with the general desired thermal flow direction from sides X to Y. However, as can be seen in FIG. 1, a transverse flow path from side A to side B is highly undesirable because of the increased number of thermal interfaces and increased volume of non-conductive polymer through which the heat must travel. Therefore, it is critical that the filler 8 be aligned properly with a thermally conductive article; namely, in parallel with the thermal flow path. In a common application is possible that the thermal conductivity of path X-Y be as much as 8 times the thermal conductivity of the path A-B transverse to the alignment of the filler. For example, the thermal conductivity of path A-B could be 2 W/m°K while the thermal conductivity of path X-Y is over 16 W/m°K.

The goal of aligning the conductive filler parallel and aligned with the thermal flow is often difficult to achieve due to complexity of the geometry of the part to be molded. As stated earlier, one of the primary reasons for employing a thermally conductive plastic composition is that it is moldable into more complex geometries to achieve better heat dissipation. Therefore, intricate part geometries are typically encountered when molding thermally conductive polymer materials. The method of molding of the present invention solves the problem of molding complex geometries with material having filler that requires alignment to the thermal flow path.

With these intricate geometries, turbulence of the flow of the filler loaded matrix is common resulting in collisions of the filler material and non-uniform alignment. While parallel aligned of the high aspect ratio filler is obviously preferred, it cannot be attained. Further, the turbulence of flow and collisions with edges of the mold often breaks the high aspect ratio filler particularly when it has an aspect ratio larger than 20:1. FIG. 1 illustrates a realistic composition 2 with filler 8 being substantially aligned to adjacent filler 8 within polymer 4. FIG. 1 is what is encountered in the field, due to the inherent problems associated with molding material with filler therein. As will be discussed in detail below, the method of the present invention permits the molding of complex geometries with reduced breakage of the high aspect ratio filler 8 which would cause the thermal conductivity of the composition to degrade.

Figure 2A:
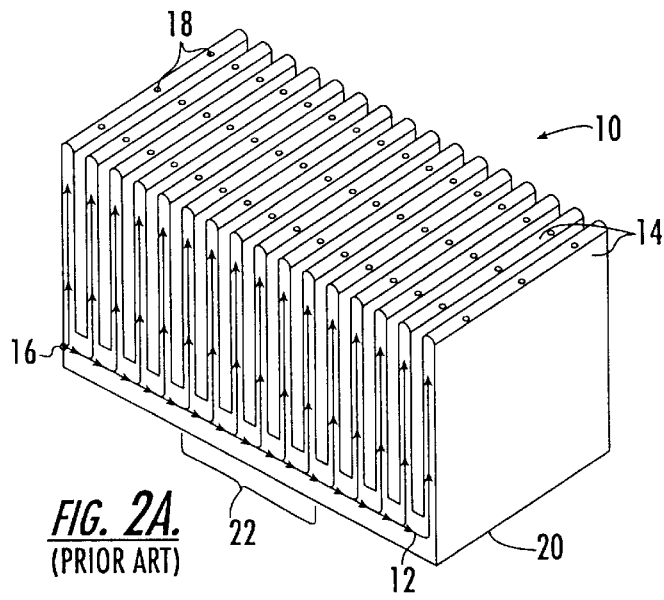
FIG. 2A is perspective view of a heat sink employing a prior art gating and venting method that is known in the art.
Figure 2B:
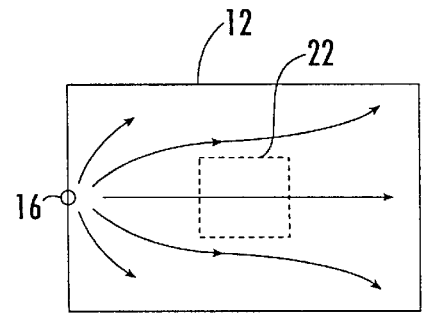
FIG. 2B is a bottom view of the heat sink in FIG. 2A.

Referring first to FIGS. 2A and 2B, a molded article employing a prior art molding process is shown. FIG. 2A shows a perspective view of a known thermally conductive article 10 is shown. In particular, thermally conductive article 10 is shown as a heat sink with a base 12 and upstanding fins 14 connected thereto. This heat sink 10 is commonly affixed to a heat generating surface of a device (not shown), such as a semiconductor package, for the purposes of transferring heat away from the hot device. This heat dissipation is critical, particularly in electronic applications, to ensure that the device does not fail due to overheating.

The bottom surface 20 of base 12 is placed into flush thermal communication with the semiconductor device to be cooled. Typically, the semiconductor device to be cooled is positioned directly below the center of the base 12, generally referenced as 22, to achieve heat spreading 360 degrees about the device to be cooled. As shown in FIG. 1B, a bottom view of molded article 10, a heat generating semiconductor device 22 is positioned in the general center area of base 12. As a result, heat will emanate outwardly from center area 22 where a heat generating semiconductor device is located.

FIGS. 2A and 2B also show the typical flow pattern of the mold material when it is introduced into a mold. The mold material is typically introduced at input gate 16 on one end of the article for flow from left to right and upward into fins 14. Venting 18 at the top portion of each fin, commonly at ejector pins (not shown), to release air within the mold cavity. A base polymer with a high aspect ratio filler to form a conductive polymer is not typical for forming heat sinks of complex geometries. Therefore, in the past, flow direction of mold material, having no filler therein, is of little if no concern. Now, with the employment of high aspect ratio filler, gating locations and flow pattern within a mold cavity is of critical importance as addressed in the method of the present invention.

Since the article of FIGS. 2A and 2B is molded with a input gate location shown at 16, the flow pattern of the mold material and, thus, the orientation alignment of the filler material will be, essentially, parallel to the indicated arrows in a general left to right arrangement. However, horizontal arrangement and alignment of filler material 8 will seriously degrade the thermal conductivity of article 10.

Positioning a heat generating semiconductor device at central area 22, heat will naturally tend to radiate outwardly in all directions. As best seen in FIG. 2B, the thermal conductivity of article 10 when travelling to the left or to the right will be generally acceptable as the thermal flow path will be parallel to the alignment of filler material 8. However, when travelling up or down, the thermal flow path will be transverse to the alignment of the filler 8 within polymer 4 thus requiring the heat to traverse additional interfaces. As a result, thermal conductivity in these directions are severely degraded. Since thermal transfer is a bulk property, the overall thermal conductivity of article 10 is not optimal and fails to fully exploit the conductive properties of filler material 8 loaded within the polymer base matrix 4.

Figure 3A:
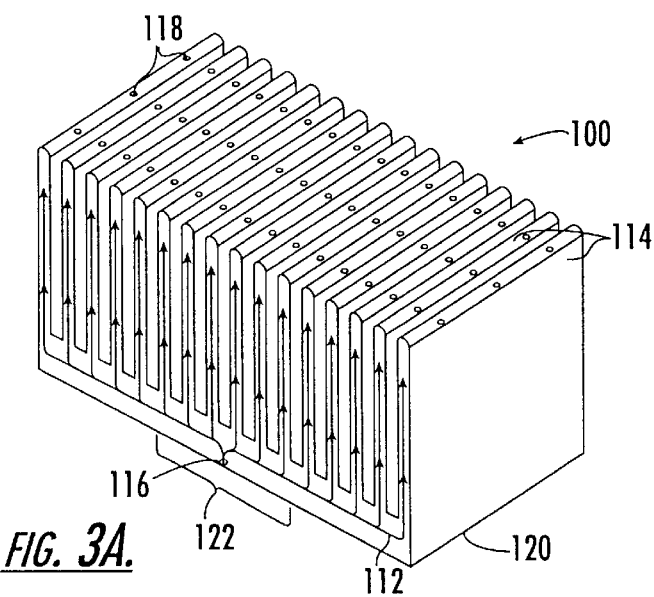
FIG. 3A is a perspective view of a heat sink employing the gating and venting method of molding of the present invention.
Figure 3B:
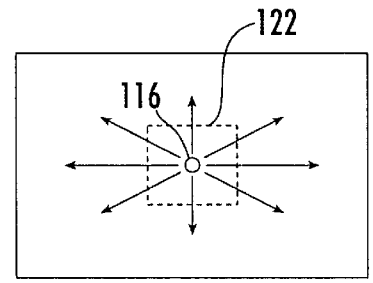
FIG. 3B is a bottom view of the heat sink in FIG. 3A.

Turning now to FIGS. 3A, 3B, 4 and 5, the method of molding of the present invention is shown in detail. Referring now to FIGS. 3A and 3B, an article 100 is provided with a base 112 and upstanding fins 114 connected thereto. A bottom surface 120 of base 112 is provided for flush thermal communication with a heat generating semiconductor device (not shown). Referring both to FIGS. 3A and 3B, which shows a bottom view of article 100, a semiconductor device is positioned substantially centrally below article 100 in the area designated as 122. In accordance with the present invention, an input mold gate is centrally provided at 16 for the introduction of mold material into the mold cavity (not shown). Further, venting is provided at 118 where, for example, ejection pins (not shown) and the clearance therearound are provided to simultaneous provide an air release and help urge the article 100 out of the mold after it has been formed.

In accordance with the present invention, the introduction of mold material at the centrally located gate 116 causes the mold composite material to flow outwardly and up into fins 114 in a radiating pattern from gate 116. This flow radiation pattern causes high aspect ratio filler 8, loaded within the polymer base matrix 4, to be aligned therewith. As a result, filler 8 is oriented in an outwardly radiating pattern, as shown by the arrows in FIG. 3B, to closely match the actual thermal radiating path of the heat emanating from a heat generating semiconductor device located at central region 122. In accordance with the present invention, the close matching of the radiating pattern of filler 8 to the actual thermal flow path of heat from central area 122 takes fully exploits the composite polymer material, namely the highly conductive properties of the high aspect ratio filler 8 therein.

Figure 4:
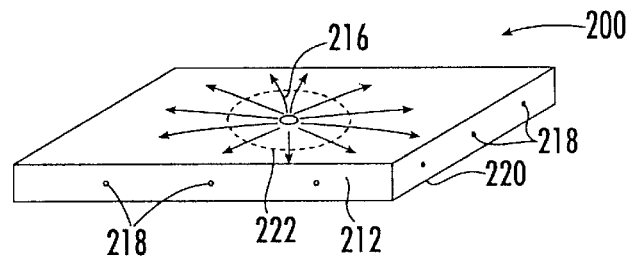
FIG. 4 is a perspective view of a heat spreader employing the gating and venting method of molding of the present invention.

FIG. 4 shows a method of molding a heat spreader in similar fashion to the heat sink shown in connection with FIGS. 3A and 3B above. In FIG. 4, a substantially flat heat spreader 200 is shown with a main body 212 with a bottom surface for contacting a heat generating member, such as a semiconductor device. In accordance with the present invention, heat spreader 200 is molded by centrally providing an input gate at 216 which has been predetermined to be the center of the heat source is located within center region 222. Venting is provided at the edges of heat spreader 212 to, in combination with input gate 216, urge flow of mold material outwardly in a radiating pattern to closely match the actual thermal flow path of heat from the semiconductor device. As stated above, outward radiating flow of mold composite material will naturally cause the high aspect ratio filler 8 to align with the flow thus matching the filler alignment with the thermal flow path.

Figure 5A:
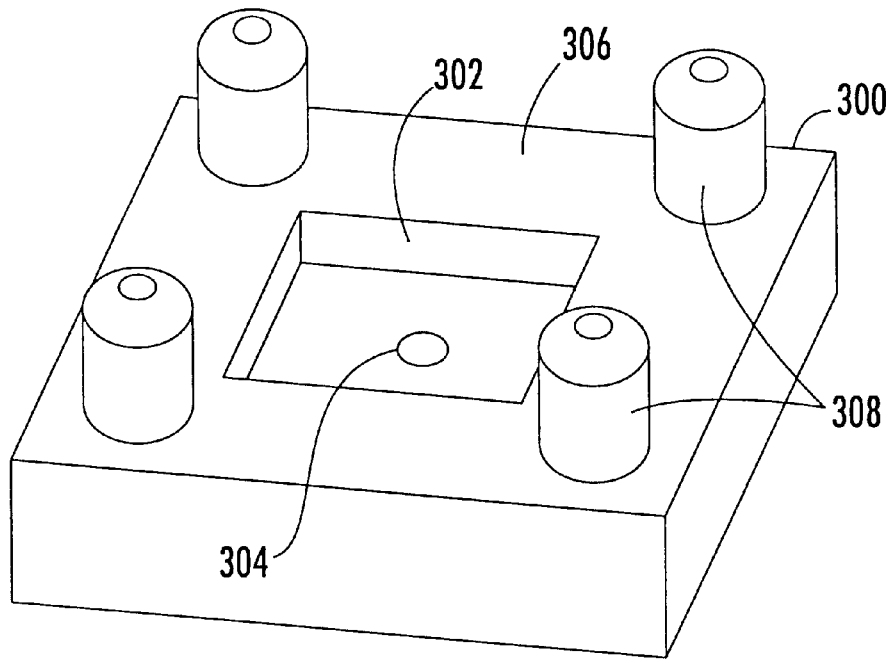
FIG. 5A is a perspective view of the bottom half of a mold apparatus employing the method of the present invention.
Figure 5B:
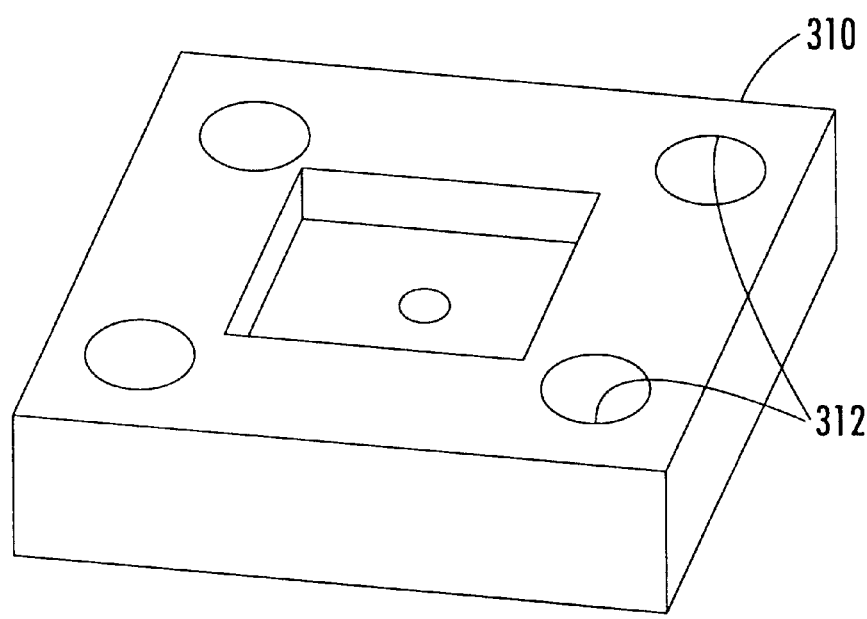
FIG. 5B is a perspective view of the top half of a mold apparatus employing the method of the present invention.

Referring now to FIGS. 5A and 5B, a mold assembly employed in the method of the present invention is shown. FIG. 5A illustrates the bottom half 300 of a mold assembly which has a main body 306 with a cavity 302 therein. Gate 304 is centrally positioned on the bottom of cavity 302 for introducing mold material into the mold. Guide pins 308 are also provided for receipt within corresponding apertures 312 on upper mold half 310 shown in FIG. 5B. The mold apparatus shown in FIGS. 5A and 5B may be generally manufactured in accordance with known mold manufacturing techniques. However, as set forth in detail above, the positioning of gate 304 is specifically selected in accordance with the present invention to fully exploit the conductive properties of the mold material having conductive filler therein.

In connection with the present invention, a method of molding a thermally conductive article for transferring heat from a heat generating surface is provided. First, the a mold assembly is selected that is capable of forming an article of a desired configuration. The contact location of the article to the generating surface is determined. In the mold assembly, an input gate is formed at a location that is in substantially at the center of the face of the article to be molded that will contact the heat generating device or surface. The optimum heat flow path through the article is then determined as well as the termination locations of the heat flow path through the article to be molded. Venting is formed in the mold assembly at termination locations of the heat flow path. As part of the molding process, a polymer, loaded with conductive high aspect ratio filler, is introduced into the mold assembly via the preselected input gate. The polymer is positioned within the mold assembly with the conductive filler being substantially parallel and aligned with the predetermined heat flow path to fully optimize the conductivity of the polymer/filler composition. After formation, the molded and finished article is ejected from the mold assembly.

EXAMPLE

The mold apparatus shown in FIGS. 5A and 5B was assembled to form a heat spreader as shown in FIG. 4. Composite mold material is introduced into the mold via an input gate located at the bottom center of the mold. The mold material used included a base polymer matrix with high aspect ratio filler carbon flakes that are $2/1000$ to $4/1000$ of an inch thick while being $40/1000$ of an inch long with a minimum aspect ratio of approximately 10:1. After molding, the carbon flakes where aligned in the heat spreader finished article in an outwardly radiating pattern extending to the edges of the article. This radiating pattern closely matches the actual flow path of heat through the article to fully exploit the thermal conductivity of the material.

As can be understood, the present invention can be adapted to form a wide array of configurations and shapes employing the method of the present invention. In that connection, the selection of the gating location and venting within the mold will effectively match the filler alignment with the actual thermal flow path of the heat from a semiconductor device. The method of the present invention achieves higher thermal conductivities than that capable of from prior methods, even employing the same conductive polymers.

It would be appreciated by those skilled in the art that various changes and modifications can be made to the illustrated embodiments without departing from the spirit of the present invention. All such modifications and changes are intended to be covered by the appended claims.

What is claimed is:

1. A method of molding a net-shape moldable thermally conductive article for transferring heat from a heat generating surface, comprising the steps of:

providing a mold assembly capable of forming an article of a desired configuration;

providing a mold cavity within said mold assembly;

determining an initial location of contact on said article with said heat generating surface;

forming an input gate centrally located in said mold assembly at said initial location of contact;

determining the optimum heat flow path through said article;

determining a termination location of said heat flow path;

introducing polymer loaded with conductive filler into said mold cavity via said input gate;

venting said mold assembly at said termination location;

introducing polymer further including aligning said conductive filler in said polymer substantially parallel to and aligned with said heat flow path by flowing said polymer outwardly in a radiating pattern through said mold cavity; and ejecting a net-shape molded article from said mold assembly.

2. The method of claim 1, further comprising the step of:

providing elongated conductive fiber as said conductive filler.

3. The method of claim 1, further comprising the step of:

providing flake-shaped material as said conductive filler.

4. The method of claim 1, further comprising the step of:

providing rice-shaped material as said conductive filler.

5. The method of claim 1, further comprising the step of:

providing carbon material as said conductive filler.

6. The method of claim 1, further comprising the step of:

providing aluminum material as said conductive filler.

7. The method of claim 1, further comprising the step of:

providing said conductive material selected from the group consisting of aluminum, alumina, copper, magnesium and brass.

* * * * *